No. 741,429. PATENTED OCT. 13, 1903.
J. YERKES.
LATHE FOR CUTTING AND TURNING CORNCOB PIPE SECTIONS.
APPLICATION FILED MAY 11, 1903.
NO MODEL. 5 SHEETS—SHEET 1.

Witnesses
Inventor
John Yerkes
by Higdon, Longan & Hopkins
attys

No. 741,429. PATENTED OCT. 13, 1903.
J. YERKES.
LATHE FOR CUTTING AND TURNING CORNCOB PIPE SECTIONS.
APPLICATION FILED MAY 11, 1903.
NO MODEL. 5 SHEETS—SHEET 3.

No. 741,429. PATENTED OCT. 13, 1903.
J. YERKES.
LATHE FOR CUTTING AND TURNING CORNCOB PIPE SECTIONS.
APPLICATION FILED MAY 11, 1903.
NO MODEL. 5 SHEETS—SHEET 4.

Witnesses
Inventor
John Yerkes
by Higdon & Longan & Hopkins
attys.

No. 741,429. PATENTED OCT. 13, 1903.
J. YERKES.
LATHE FOR CUTTING AND TURNING CORNCOB PIPE SECTIONS.
APPLICATION FILED MAY 11, 1903.
NO MODEL. 5 SHEETS—SHEET 5.
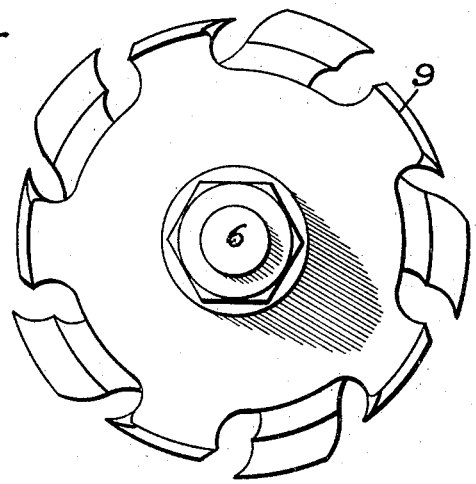
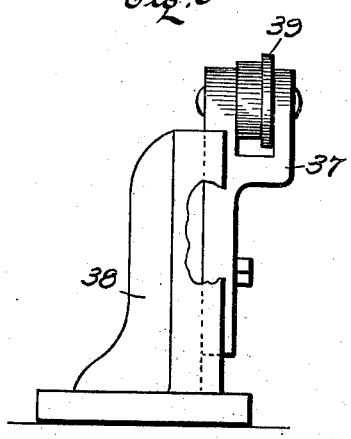
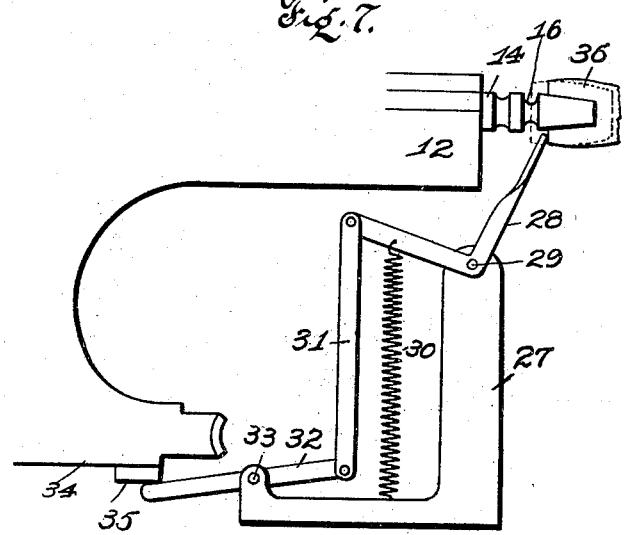
Witnesses
Alfred A. Eicker
M. Quinn
Inventor
John Yerkes
by Higdon & Longan & Hopkins
attys No. 741,429. Patented October 13, 1903.

UNITED STATES PATENT OFFICE.

JOHN YERKES, OF ST. LOUIS, MISSOURI.

LATHE FOR CUTTING AND TURNING CORNCOB PIPE-SECTIONS.

SPECIFICATION forming part of Letters Patent No. 741,429, dated October 13, 1903.

Application filed May 11, 1903. Serial No. 156,660. (No model.)

*To all whom it may concern:*

Be it known that I, JOHN YERKES, a citizen of the United States, residing at St. Louis, State of Missouri, have invented certain new and useful Improvements in Lathes for Cutting and Turning Corncob Pipe-Sections, of which the following is a specification containing a full, clear, and exact description, reference being had to the accompanying drawings, forming a part hereof.

My invention relates to an improved lathe for cutting and turning corncob pipe-bowls, and has for its object to provide means whereby such pipe-bowls may be accurately turned from corncobs at high speed.

Figure 1:
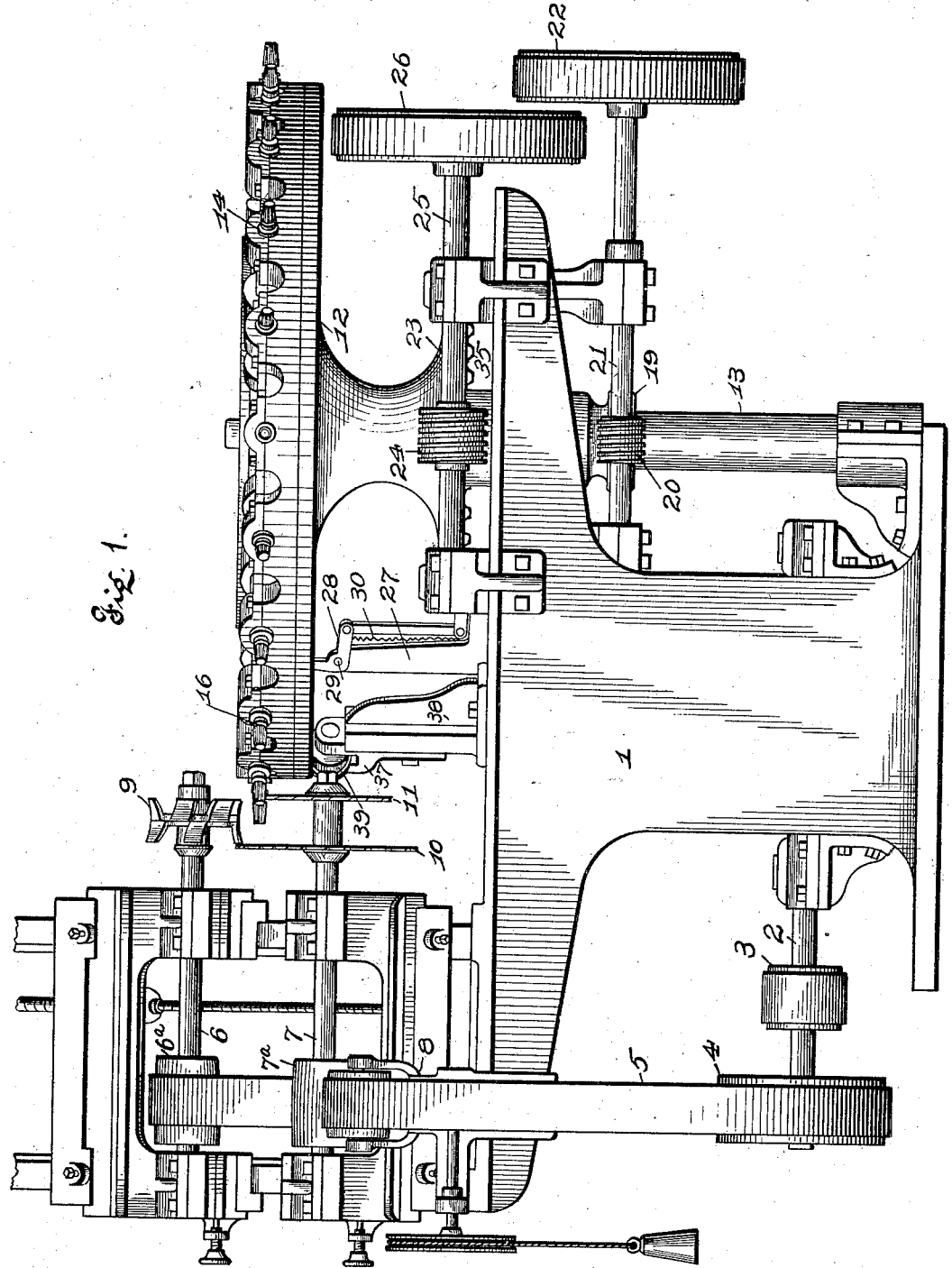
Figure 2:
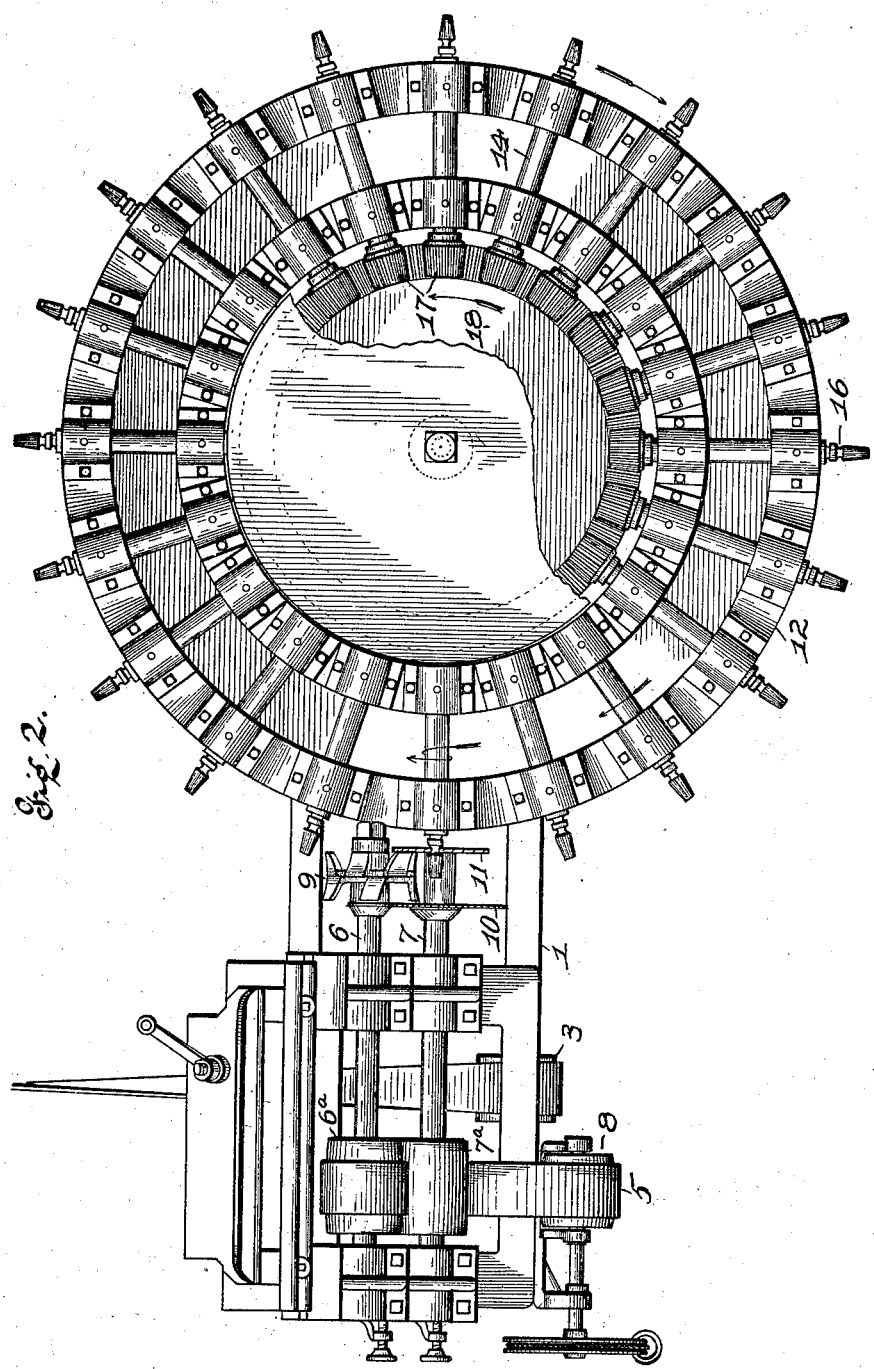
Figure 3:
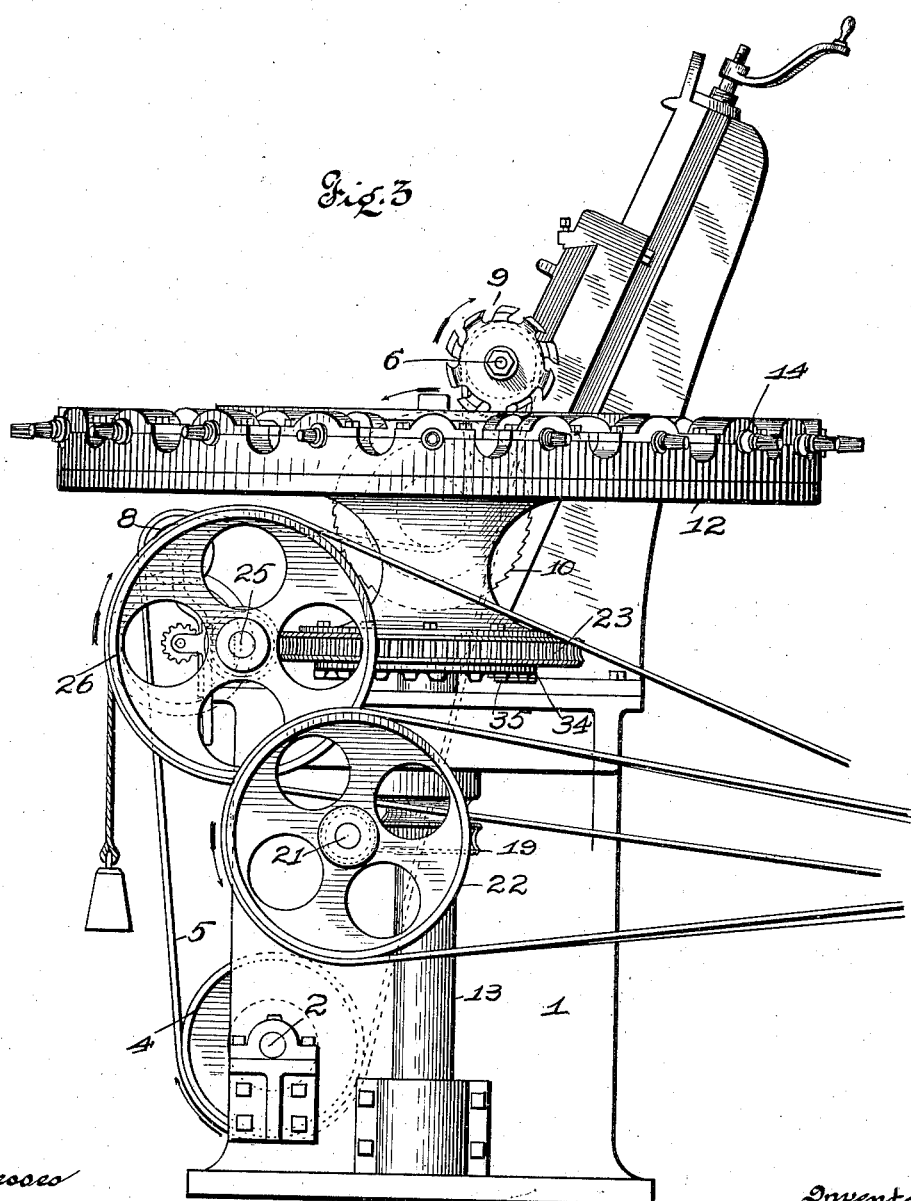
Figure 4:
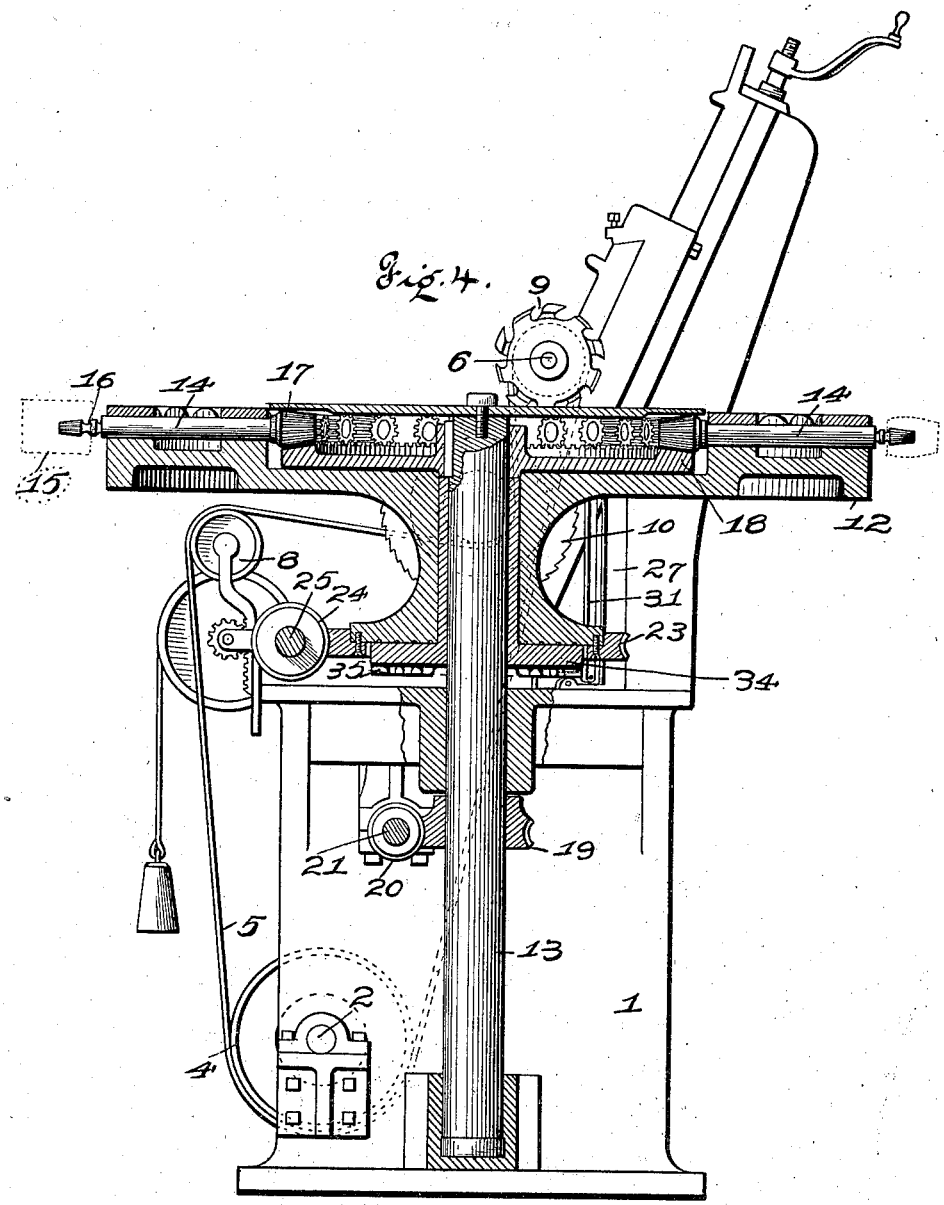

In the drawings, Figure 1 is a front view of a machine embodying my invention. Fig. 2 is a top view of the same. Fig. 3 is a side view of the same. Fig. 4 is a transverse sectional view of the same, showing the chuck-table in mid-section. Fig. 5 is an enlarged side view of the turning-tool employed. Fig. 6 is an enlarged view of the bearing used as a guide for the chuck-table at a point near the saws. Fig. 7 is an enlarged side view of the ejector by which the turned pipe-bowls are removed from the chuck-table.

The main frame 1 carries the shaft 2, which is actuated, through the pulley 3, from any suitable source of power, thus driving the pulley 4 and belt 5, which actuates the tool-shaft 6 and saw-shaft 7 through the pulleys 6ª and 7ª, respectively. The driving mechanism employed is old and common in the art and is therefore not described in detail. It is sufficient for the purposes of this description to state that the shafts 6 and 7 are thrown into or out of operation by means of the belt-tightener 8. The shaft 6 is provided with a tool 9, which is shown in an enlarged view in Fig. 5. The shaft 7 is provided with the circular saws 10 and 11, the distance between which indicates the length of the pipe-bowls to be turned. It is thus apparent that by carrying a corncob-section between the saws 10 and 11 and beneath the tool 9 the exterior of the pipe-bowl will be formed by the tool 9 shaping its sides and the saws 10 and 11 cutting the cob to the desired length. To this end and in order that such cob-sections may be fed to the said tool 9 and saws 10 and 11 quickly and accurately and at high speed I have devised mechanism which may be described as follows:

The chuck-table 12 is mounted loosely upon the vertical bearer 13 and is provided with a series of horizontally-mounted chucks 14, adapted to grasp the cob-sections intended to be turned, one of such cob-sections being indicated by dotted lines 15 in Fig. 4. The chucks 14 are provided near the periphery of the table 12 with circular grooves 16, which are adapted to pass over the top of the saw 11. The chucks 14 terminate at their inner extremities in bevel-gears 17, which are actuated by contact with the teeth of the face-wheel 18, which face-wheel 18 is caused to revolve in the opposite direction to the movement of the chuck-table 12 by being rigidly mounted upon the bearer 13, which is provided with the gear 19. The gear 19 is actuated by the worm 20, mounted upon the shaft 21, which is driven by the pulley 22 from any desired source of power. The chuck-table 12 is provided with the gear 23, which is actuated by the worm 24. The worm 24 is mounted upon the shaft 25 and driven by the pulley 26. The pulleys 22 and 26 are actuated in opposite directions, as indicated by the adjacent arrows in Fig. 3, thus imparting the oppositely-directed motion of the face-wheel 18 and chuck-table 12, which directions of motion are indicated by the arrows in Fig. 2.

The mode of operation of the above-described machine is as follows: Sections of corncob are placed by hand upon the chucks 14 from the front of the machine, as shown in Fig. 1, and as the said chucks successively advance to contact with the saws 10 and 11 and tool 9 and as each chuck comes in contact with the saws 10 and 11 the outer end of the cob-section is squarely cut by the saw 10 and the inner end of the cob-section is similarly cut by the saw 11, and the section being thus cut to the desired length its sides are shaped by the tool 9.

Having thus provided for the carriage of the cob-sections to and through the operation of cutting and turning, it is desirable to provide means for the automatic ejection of the turned cob-sections from the machine. To this end I have devised the following means: I have provided the main frame 1 with the standard 27, to which the bell-crank lever 28 is mounted by the pivot 29, the lower arm of the bell-crank lever 28 being normally held downward by means of the coil-spring 30. The bell-crank lever 28 is provided with the connecting-bar 31, by which the inner extremity of its lower arm is connected to the lever 32, which is pivotally mounted upon the standard 27 by means of the pin 33. The base of the table 12 is provided with the face-wheel 34, having teeth 35, corresponding in number to the chucks 14 and located in a corresponding vertical plane thereto. The ejecting device thus described is mounted, as shown in Fig. 1, at a point to the rear of the turning and cutting devices. As the chuck 14, carrying the cut and turned cob-section 36, reaches the bell-crank lever 28 the inner end of the lever 32 contacts with the corresponding tooth 35, thus thrusting the vertical arm of the bell-crank lever 28 outwardly and throwing the cut and turned cob-section 36 outwardly and from the chuck 14. In order to secure the accurate adjustment of the table 12, I have provided the vertically-adjustable bracket 37, mounted in a standard 38 and carrying the flanged bearing-wheel 39.

By means of the above-described machine corncob pipe-bowls may be cut, turned, and ejected with perfect accuracy and at extremely high speed.

Having thus described my invention, what I claim as new, and desire to have secured to me by the grant of Letters Patent, is—

1. In a lathe for cutting and turning corncob pipe-bowls, a turning-tool, saws whereby the cob-section is cut in the desired length, a chuck-table, chucks mounted in the chuck-table and provided with gears at their inner extremities, a face-wheel mounted within the chuck-table and concentric therewith and adapted to revolve the chucks, and means whereby the chuck-table and the face-wheel may be simultaneously revolved in opposite directions, substantially as described.

2. In a lathe for cutting and turning corncob pipe-bowls, a turning-tool, saws whereby the cob-section is cut in the desired length, a chuck-table, chucks mounted in the chuck-table and provided with gears at their inner extremities, a face-wheel mounted within the chuck-table and concentric therewith and adapted to revolve the chucks, means whereby the chuck-table and the face-wheel may be simultaneously revolved in opposite directions, and means whereby the cut and turned cob-sections may be ejected from the chucks, substantially as described.

In testimony whereof I have signed my name to this specification in presence of two subscribing witnesses.

JOHN YERKES.

Witnesses:
ALFRED A. EICKS,
M. G. IRION.